US006996744B2

(12) United States Patent
Whitten et al.

(10) Patent No.: US 6,996,744 B2
(45) Date of Patent: Feb. 7, 2006

(54) GENERATING A PASSCODE FOR RESETTING A GAME CONSOLE

(75) Inventors: Jon Marcus Randall Whitten, Sammamish, WA (US); Christopher M. Pirich, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 449 days.

(21) Appl. No.: 10/116,900

(22) Filed: Apr. 4, 2002

(65) Prior Publication Data

US 2003/0191979 A1 Oct. 9, 2003

(51) Int. Cl.
*G06F 11/00* (2006.01)
(52) U.S. Cl. .......................................... 714/15; 711/164
(58) Field of Classification Search .................... 714/5, 714/15, 19; 711/164
See application file for complete search history.

(56) References Cited

U.S. PATENT DOCUMENTS

| | | | |
|---|---|---|---|
| 5,214,695 A | | 5/1993 | Arnold et al. |
| 5,375,243 A | * | 12/1994 | Parzych et al. ............. 713/202 |
| 5,564,011 A | | 10/1996 | Yammine et al. |
| 6,281,894 B1 | * | 8/2001 | Rive .......................... 345/705 |
| 6,468,160 B2 | | 10/2002 | Biegun et al. |
| 6,519,762 B1 | * | 2/2003 | Colligan et al. ............ 717/170 |
| 6,557,169 B1 | * | 4/2003 | Erpeldinger ................ 717/173 |
| 6,591,376 B1 | * | 7/2003 | VanRooven et al. .......... 714/36 |
| 6,712,704 B2 | | 3/2004 | Eliott |
| 6,748,553 B2 | * | 6/2004 | McBride et al. .............. 714/15 |
| 6,754,855 B1 | * | 6/2004 | Denninghoff et al. ......... 714/48 |
| 6,769,989 B2 | | 8/2004 | Smith et al. |
| 2002/0042892 A1 | * | 4/2002 | Gold ............................. 714/6 |
| 2002/0147914 A1 | * | 10/2002 | Arnold ....................... 713/186 |
| 2004/0162137 A1 | | 8/2004 | Eliott |

OTHER PUBLICATIONS

Fully Licensed GmbH, "Inside Windows Product Activation", Jul. 2001, www.licenturion.com [http://www.licenturion.com/xp/fulllicensed-wpa.txt Oct. 24, 2004].*
David D. Langan and Thomas J. Scott, "A Methodology for Fast PC Hard Disk State Restoration," University of South Alabama & Western Illinois University, 1992, pp. 1105-1110.
Dean Takahashi, "Microsoft goes gaming. (Product Development)," Electronic Business, May, 2000, 2 pages.
Press Pass, "Xbox to Deliver Ultimate Console Gaming Experience," San Jose, Calif., Mar. 10, 2000, 3 pages, 2001.
IGN.com, "What is the 64DD?," Sep. 17, 1997, 9 pages.
IGN.com, "The 64DD: Nintendo's Disk Drive,—Everything you ever wanted to know about the N64's first major add-on," Jan. 28, 1998, 7 pages.
IGN.com, "The 64DD Connection-Here's how the 64DD and Nintendo 64 connect," Oct. 20, 1999, 5 pages.
IGN.com, "IGN64's Ultimate 64DD FAQ—Everything you ever wanted to know about the upcoming disk drive add-on. Updated: 12/13," Dec. 15, 1999, 12 pages.

(Continued)

*Primary Examiner*—Robert Beausoliel
*Assistant Examiner*—Gabriel L. Chu
(74) *Attorney, Agent, or Firm*—Lee & Hayes, PLLC

(57) ABSTRACT

A device includes a processor and a hard disk drive coupled to the processor. The hard disk drive stores various data associated with the device and includes a first partition and a second partition. Data stored in the first partition is cleared during a system reset operation. Data stored in the second partition is not cleared during the system reset operation. The first partition stores saved application data, device configuration information, and the like. The second partition stores a console application that implements a user interface to the device. The second partition also stores a reset application that implements a system reset operation.

5 Claims, 6 Drawing Sheets

OTHER PUBLICATIONS

C/net News.com, "U.S. version of PlayStation2 to have modem, hard drive," By Bloomberg News, Apr. 14, 2000, 2 pages.

ZDNetUK News, Rick Lehrbaum, LinuxDevices.com, Special to ZDNet, "Linux fuels games console plus," Jul. 7, 2000, 3 pages.

CNET CNET Gamecenter.com, Todd Mowatt, Indrema: Linux-Based Console, Aug. 11, 2000, 2 pages.

Planet GeForce, "Interviews—John Gildred of Indrema on the L600," Interviewed by Christopher "Razor" Gordon, Oct. 19, 2000, 5 pages.

* cited by examiner

GENERATING A PASSCODE FOR RESETTING A GAME CONSOLE

TECHNICAL FIELD

This invention relates to electronic devices, and more particularly, to the resetting of data stored on a disk drive or other storage device in an electronic device.

BACKGROUND

Gaming systems currently available on the market are capable of playing game discs, music CDs, and movie DVDs from a disc drive. For example, the Playstation® 2 gaming system from Sony Corporation provides the ability to play games, music, and video titles from a disc inserted in the console. These gaming systems have limited internal data storage capacity. Typically, the internal data storage is used to store system and configuration information, such as the local time, the language preference of the user, and other settings. Other data, such as saved game data and other game-specific data, is generally stored on a memory device that is external to the game console. For example, memory units that are inserted into a handheld game controller store game information for later retrieval by a game console. Existing gaming systems do not contain an internal non-removable hard disk drive for storing saved games and other information.

A new generation of video gaming systems are equipped with a hard disk drive to enhance gaming, and broadband connectivity to facilitate online gaming. With these additions, significant amounts of data (e.g., saved game data from multiple game titles and multiple users of the gaming system) can be stored within the video gaming system using the hard disk drive. This new internal storage capability creates new issues with respect to software or data corruption on the hard disk drive. Returning a video gaming system to the manufacturer to correct the software and/or data corruption is an inconvenience to the user who is unable to use the system for a significant period of time.

Accordingly, there is a need for a reset mechanism for gaming systems and other devices that allows a hard disk drive to be reset to a known state. Further, there is a need to avoid abuse of the reset mechanism. Such abuse could result in the deletion of many hours of saved game information, device configuration information, high scores, etc.

SUMMARY

A device, such as a gaming system, includes a processor and a hard disk drive for storing various data. The hard disk drive includes a first partition and a second partition. Data stored in the first partition is cleared during a system reset operation. Data stored in the second partition is not cleared during a system reset operation. The first partition includes data generated and saved by one or more applications executing on the device. The second partition includes application programs and other types of read-only data.

In a particular implementation, a game console is booted from a first partition of a hard disk drive integrated into the game console. The first partition of the hard disk drive is designated read-only. Data generated during operation of the game console is stored on a second partition of the hard disk drive.

In another implementation, a serial number is assigned to a game console. A hidden code is stored in a storage device contained in the game console. The serial number and the associated hidden code are stored in a database for later reference. A passcode is generated by applying a passcode algorithm to the hidden code. The passcode identifies a series of control inputs required to reset the game console.

In a described implementation, a technical support agent is contacted regarding a device. A device serial number is provided to the technical support agent. A passcode is received from the technical support agent. The passcode is then applied to the device, which verifies the applied passcode by calculating the passcode from a hidden code in the device. The device is reset to a factory default state if the applied passcode is verified.

DETAILED DESCRIPTION

Although particular examples discussed herein refer to gaming systems, the methods and apparatus of the present invention may be applied to any device having a hard disk drive or other storage mechanism that can be reset to a factory default state. The hard disk drive or other storage mechanism is partitioned into a bootable region that is protected as read-only (i.e., not erased during a reset operation) and a second partition that has read and write capabilities and is erased during a reset operation.

Figure 1:
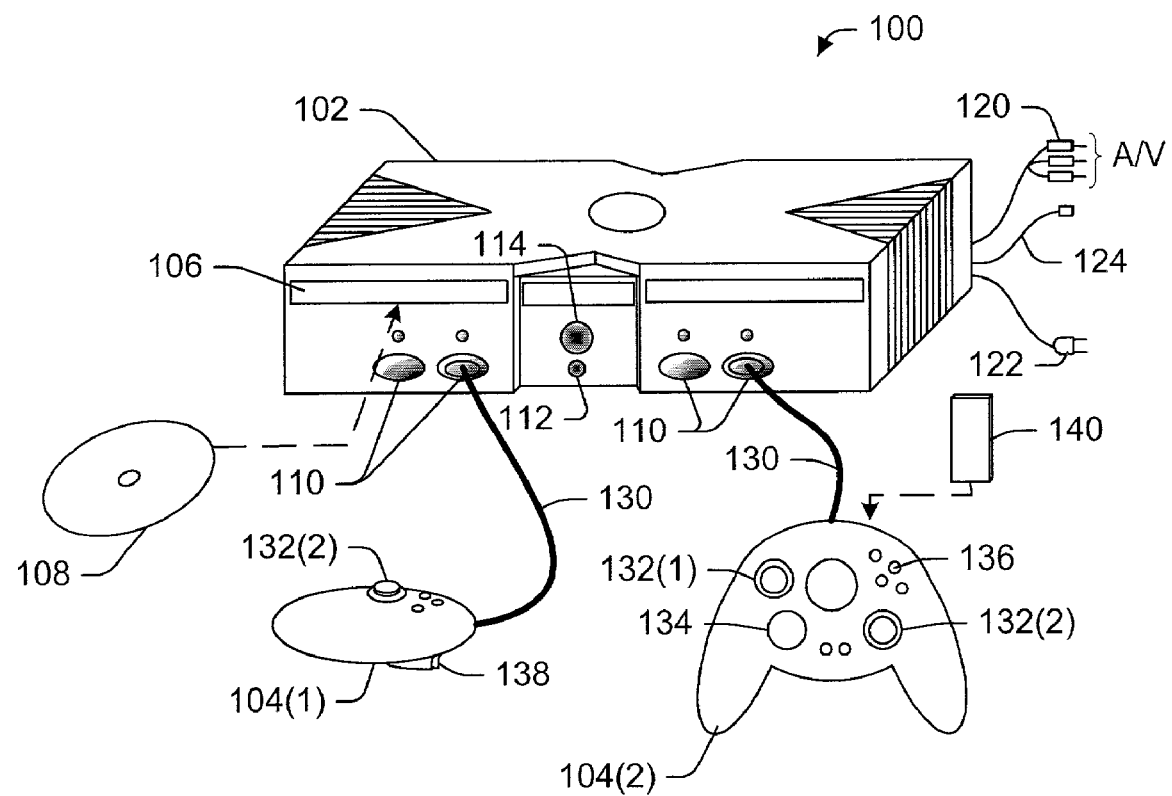
FIG. 1 illustrates an exemplary gaming system.

FIG. 1 shows an exemplary gaming system 100. The gaming system 100 includes a game console 102 and up to four controllers, as represented by controllers 104(1) and 104(2). The game console 102 is equipped with an internal hard disk drive and a portable media drive 106 that supports various forms of portable storage media as represented by optical storage disc 108. Examples of suitable portable storage media include DVD, CD-ROM, game discs, and so forth.

The game console 102 has four slots 110 on its front face to support up to four controllers, although the number and arrangement of slots may be modified. A power button 112 and an eject button 114 are also positioned on the front face of the game console 102. The power button 112 switches power to the game console and the eject button 114 alternately opens and closes a tray of the portable media drive 106 to allow insertion and extraction of the storage disc 108.

The game console 102 connects to a television or other display (not shown) via A/V interfacing cables 120. A power cable 122 provides power to the game console. The game console 102 may further be configured with broadband capabilities, as represented by the cable or modem connector 124 to facilitate access to a network, such as the Internet.

Each controller 104 is coupled to the game console 102 via a wire or wireless interface. In the illustrated implementation, the controllers are USB (Universal Serial Bus) compatible and are connected to the console 102 via serial cables 130. The controller 102 may be equipped with any of a wide variety of user interaction mechanisms. As illustrated in FIG. 1, each controller 104 is equipped with two thumbsticks 132(1) and 132(2), a D-pad 134, buttons 136, and two triggers 138. These mechanisms are merely representative, and other known gaming mechanisms may be substituted for or added to those shown in FIG. 1.

A memory unit (MU) 140 may be inserted into the controller 104 or the game console 102 to provide additional and portable storage. Memory units 140 enable users to store game parameters and port them for play on other consoles. For example, a user can save a game to a memory unit 140 using a particular game console then use that saved game data with a game executed on a different game console. In the described implementation, each controller is configured to accommodate two memory units 140, although more or less than two units may be employed in other implementations. A particular game console 102 may be configured to accommodate any number of memory units 140.

The gaming system 100 is capable of playing, for example, games, music, and videos. With the different storage offerings, titles can be played from the hard disk drive or the portable medium 108 in drive 106, from an online source, or from a memory unit 140. A sample of what the gaming system 100 is capable of playing back include:

1. Game titles played from CD and DVD discs, from the hard disk drive, or from an online source.
2. Digital music played from a CD in the portable media drive 106, from a file on the hard disk drive (e.g., Windows Media Audio (WMA) format), or from online streaming sources.
3. Digital audio/video played from a DVD disc in the portable media drive 106, from a file on the hard disk drive (e.g., Active Streaming Format), or from online streaming sources.

Figure 2:
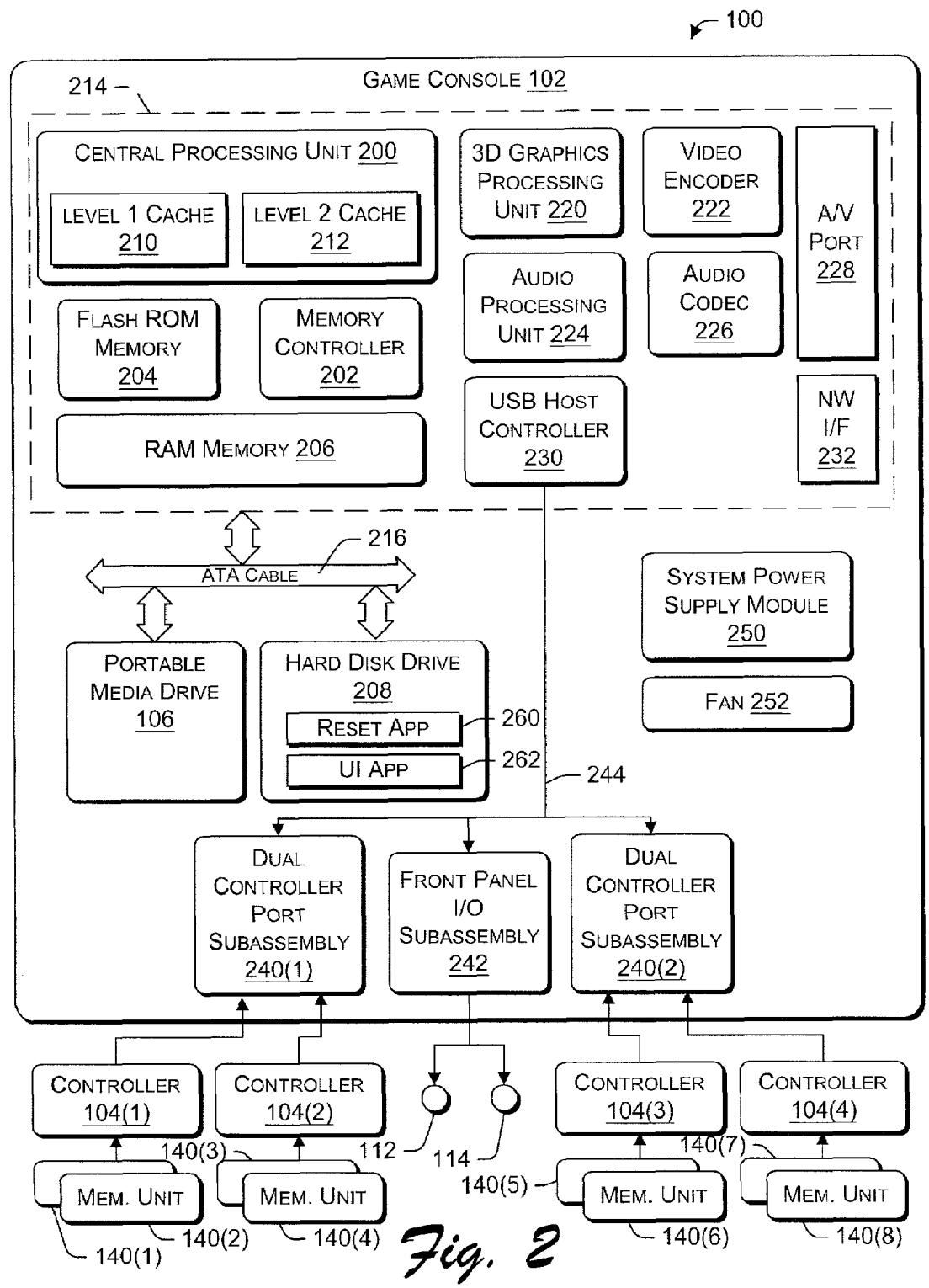
FIG. 2 is a block diagram of the gaming system.

FIG. 2 shows functional components of the gaming system 100 in more detail. The game console 102 has a central processing unit (CPU) 200 and a memory controller 202 that facilitates processor access to various types of memory, including a flash ROM (Read Only Memory) 204, a RAM (Random Access Memory) 206, a hard disk drive 208, and the portable media drive 106. The CPU 200 is equipped with a level 1 cache 210 and a level 2 cache 212 to temporarily store data and hence reduce the number of memory access cycles, thereby improving processing speed and throughput.

The CPU 200, memory controller 202, and various memory devices are interconnected via one or more buses, including serial and parallel buses, a memory bus, a peripheral bus, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus, also known as a Mezzanine bus.

As one suitable implementation, the CPU 200, memory controller 202, ROM 204, and RAM 206 are integrated onto a common module 214. In this implementation, ROM 204 is configured as a flash ROM that is connected to the memory controller 202 via a PCI (Peripheral Component Interconnect) bus and a ROM bus (neither of which are shown). RAM 206 is configured as multiple DDR SDRAM (Double Data Rate Synchronous Dynamic RAM) that are independently controlled by the memory controller 202 via separate buses (not shown). The hard disk drive 208 and portable media drive 106 are connected to the memory controller via the PCI bus and an ATA (AT Attachment) bus 216.

A 3D graphics processing unit 220 and a video encoder 222 form a video processing pipeline for high speed and high resolution graphics processing. Data is carried from the graphics processing unit 220 to the video encoder 222 via a digital video bus (not shown). An audio processing unit 224 and an audio codec (coder/decoder) 226 form a corresponding audio processing pipeline with high fidelity and stereo processing. Audio data is carried between the audio processing unit 224 and the audio codec 226 via a communication link (not shown). The video and audio processing pipelines output data to an A/V (audio/video) port 228 for transmission to the television or other display. In the illustrated implementation, the video and audio processing components 220–228 are mounted on the module 214.

Also implemented on the module 214 are a USB host controller 230 and a network interface 232. The USB host controller 230 is coupled to the CPU 200 and the memory controller 202 via a bus (e.g., PCI bus) and serves as host for the peripheral controllers 104(1)–104(4). The network interface 232 provides access to a network (e.g., the Internet, home network, etc.) and may be any of a wide variety of various wired or wireless interface components including an Ethernet card, a modem, a Bluetooth module, a cable modem, and the like.

The game console 102 has two dual controller support subassemblies 240(1) and 240(2), with each subassembly supporting two game controllers 104(1)–104(4). A front panel I/O subassembly 242 supports the functionality of the power button 112 and the eject button 114, as well as any LEDs (light emitting diodes) or other indicators exposed on the outer surface of the game console. The subassemblies 240(1), 240(2), and 242 are coupled to the module 214 via one or more cable assemblies 244.

Eight memory units 140(1)–140(8) are illustrated as being connectable to the four controllers 104(1)–104(4), i.e., two memory units for each controller. Each memory unit 140 offers additional storage on which games, game parameters, and other data may be stored. When inserted into a controller, the memory unit 140 can be accessed by the memory controller 202. Additionally, one or more memory units 140 may be inserted into game console 102 and accessed by the memory controller 202.

A system power supply module 250 provides power to the components of the gaming system 100. A fan 252 cools the circuitry within the game console 102.

The game console 102 implements a uniform media portal model that provides a consistent user interface and navigation hierarchy to move users through various entertainment areas. The portal model offers a convenient way to access content from multiple different media types—game data, audio data, and video data—regardless of the media type inserted into the portable media drive 106.

To implement the uniform media portal model, a console user interface (UI) application 262 is stored on the hard disk drive 208. When the game console is powered on, various portions of the console application 260 are loaded into RAM 206 and/or caches 210, 212 and executed on the CPU 200. The console application 260 presents a graphical user interface that provides a consistent user experience when navigating to different media types available on the game console. Thus, the hard disk drive 208 (and the data stored thereon) is an important part of the initialization process. If the hard disk drive 208 is not functioning properly, the gaming system 100 may not boot successfully. Hard disk drive 208 also contains a system reset application 260, which is capable of resetting the hard disk drive to a known state (e.g., the same state as when the game console 102 left the factory).

The gaming system 100 may be operated as a standalone system by simply connecting the system to a television or other display. In this standalone mode, the gaming system 100 allows one or more players to play games, watch movies, or listen to music. However, with the integration of broadband connectivity made available through the network interface 232, the gaming system 100 may further be operated as a participant in a larger network gaming community.

Figure 3:
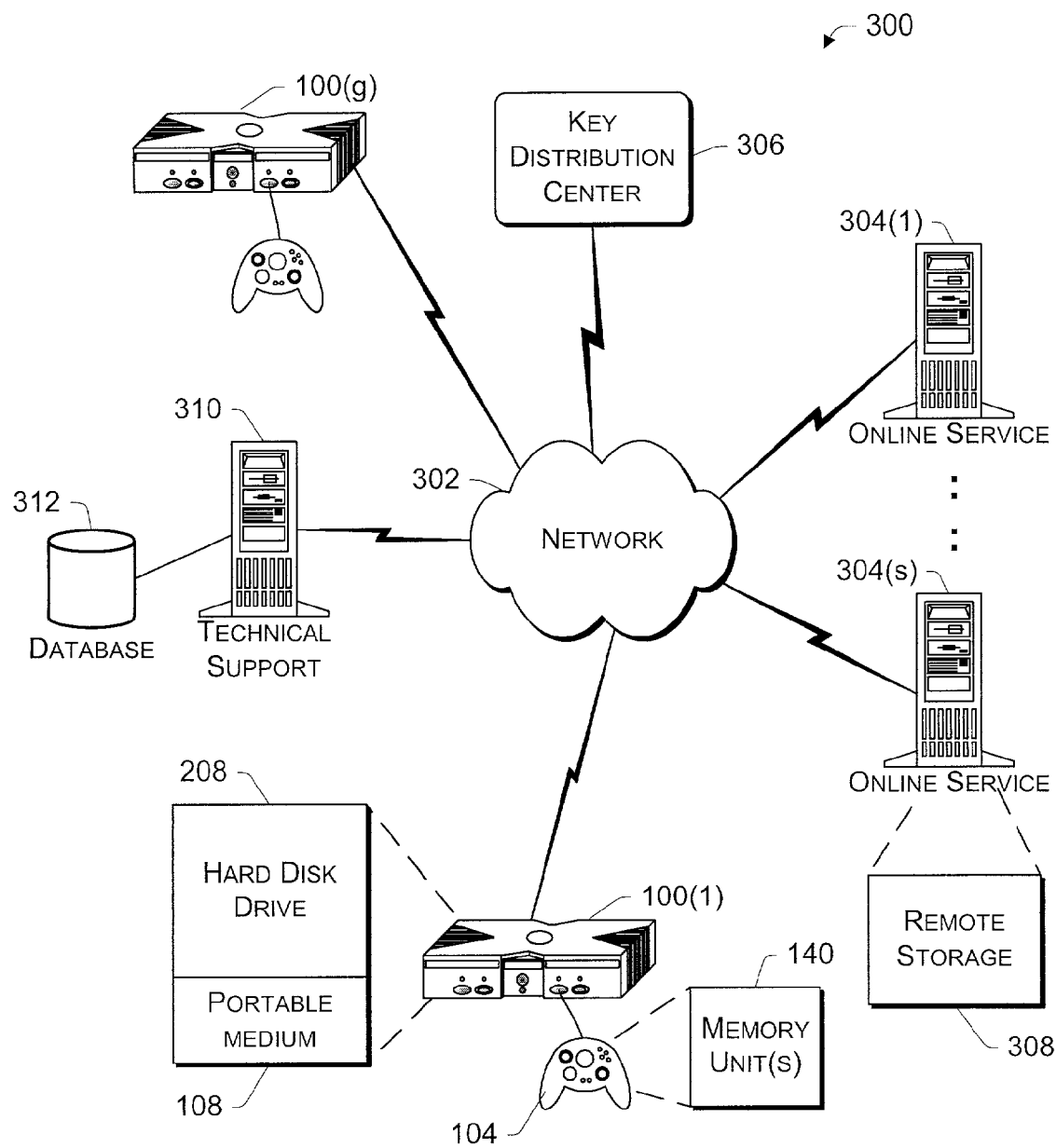
FIG. 3 illustrates a network gaming system in which the FIG. 1 gaming system is connected via a network to other consoles and services.

FIG. 3 shows an exemplary network gaming environment 300 that interconnects multiple gaming systems 100(1), . . . , 100(g) via a network 302. The network 302 represents any of a wide variety of data communications networks. It may include public portions (e.g., the Internet) as well as private portions (e.g., a residential Local Area Network (LAN)), as well as combinations of public and private portions. Network 302 may be implemented using any one or more of a wide variety of conventional communications media including both wired and wireless media. Any of a wide variety of communications protocols can be used to communicate data via network 302, including both public and proprietary protocols. Examples of such protocols include TCP/IP, IPX/SPX, NetBEUI, etc.

In addition to gaming systems 100, one or more online services 304(1), . . . , 304(s) may be accessible via the network 302 to provide various services for the participants, such as hosting online games, serving downloadable music or video files, hosting gaming competitions, serving streaming audio/video files, and the like. The network gaming environment 300 may further involve a key distribution center 306 that plays a role in authenticating individual players and/or gaming systems 100 to one another as well as online services 304. The distribution center 306 distributes keys and service tickets to valid participants that may then be used to form games amongst multiple players or to purchase services from the online services 304.

The network gaming environment 300 may also include one or more technical support centers and/or systems 310. The technical support centers 310 may provide one or more customer support agents to answer questions and diagnose problems encountered by gaming system users. The technical support centers 310 may access one or more databases 312 containing information about individual game consoles (e.g., serial numbers and related information) or common problems with game consoles and recommended solutions. Database 312 may be coupled directly to a technical support server or may be coupled to network 302 for access by other devices coupled to the network.

The network gaming environment 300 introduces another memory source available to individual gaming systems 100—online storage. In addition to the portable storage medium 108, the hard disk drive 208, and the memory unit(s) 140, the gaming system 100(1) can also access data files available at remote storage locations via the network 302, as exemplified by remote storage 308 at online service 304(s).

Figure 4:
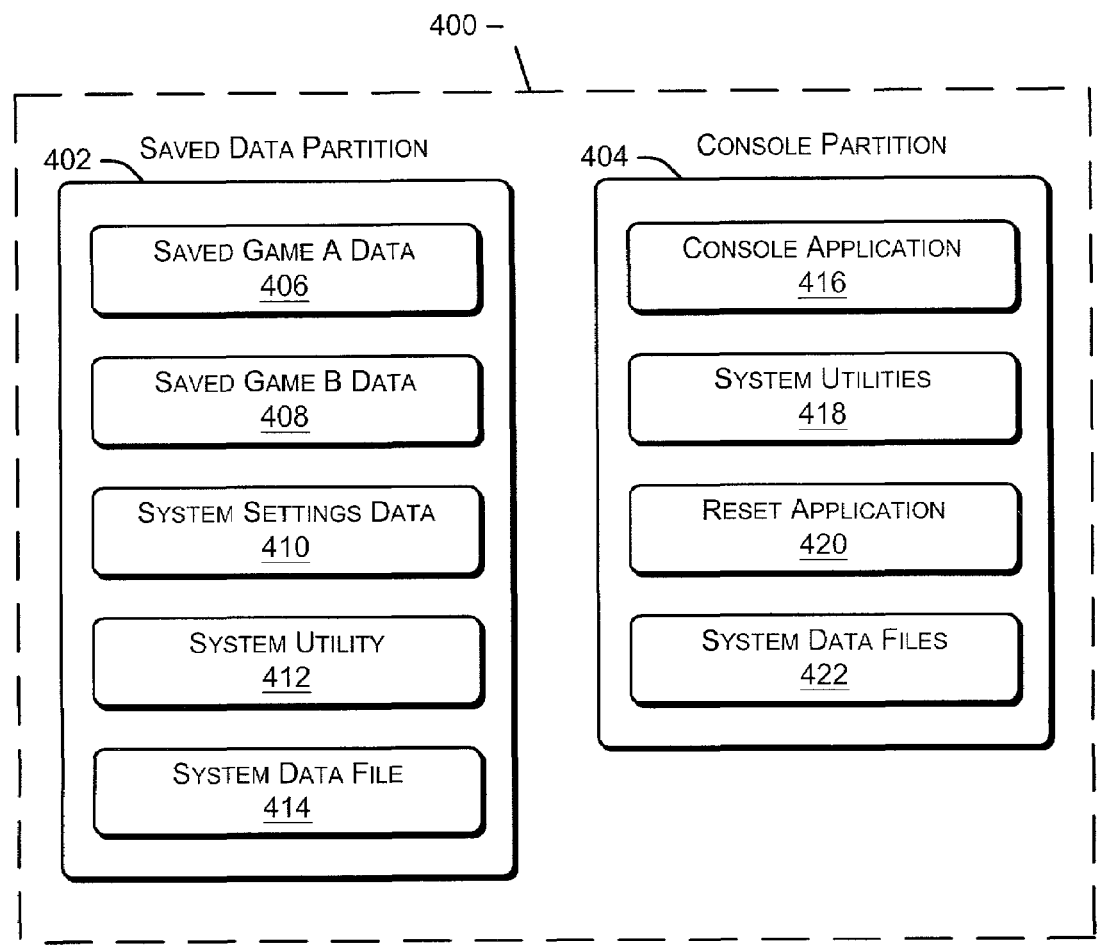
FIG. 4 illustrates an exemplary hard disk drive 400 containing two separate partitions.

FIG. 4 illustrates an exemplary hard disk drive 400 containing two separate partitions (referred to as a "saved data partition" 402 and a "console partition" 404). As discussed in greater detail below, each partition 402, 404 stores a particular type of data and has specific data access policies that, for example, prevent data in the console partition from being modified or deleted. The partitions shown in FIG. 4 are provided as an example. In alternate implementations, a hard disk drive may contain any number of partitions.

The saved data partition 402 contains, for example, saved game data 406 and 408, system settings data 410, a system utility 412, and a system data file 414. Saved game data 406 and 408 may include high scores, previously saved games, and additional game levels or features downloaded or otherwise installed on the hard disk drive 400. System settings data 410 includes current date, current time, preferred language, and other settings associated with the gaming system in which the hard disk drive 400 is installed. System utility 412 may be downloaded or otherwise installed on the hard disk drive 400 by the user of the gaming system or may be copied from the console partition 404 to the saved data partition 402. System data file 414 may be generated by system utility 412 or another system utility or system application. For example, regularly used system data files 414 may be copied from console partition 404 to saved data partition 402 such that the data is primarily accessed from the saved data partition 402.

The console partition 404 contains, for example, a console application 416, one or more system utilities 418, a reset application 420, and one or more system data files 422. Console application 416 is executed by the gaming system in addition to other applications (such as games, music applications, and movie applications). The console application performs various functions necessary to operate the gaming system, such as implementing a user interface, performing configuration operations, and performing various management functions. System utilities 418 perform various functions in the gaming system, such as managing disk space usage and memory space usage. Reset application 420 resets the gaming system to a factory default setting, which includes deleting all information and data stored in the saved data partition 402. Additional details regarding the operation of the reset application 420 are provided below. System data files 422 are used by one or more applications, such as console application 416, during operation of the gaming system.

Figure 5:
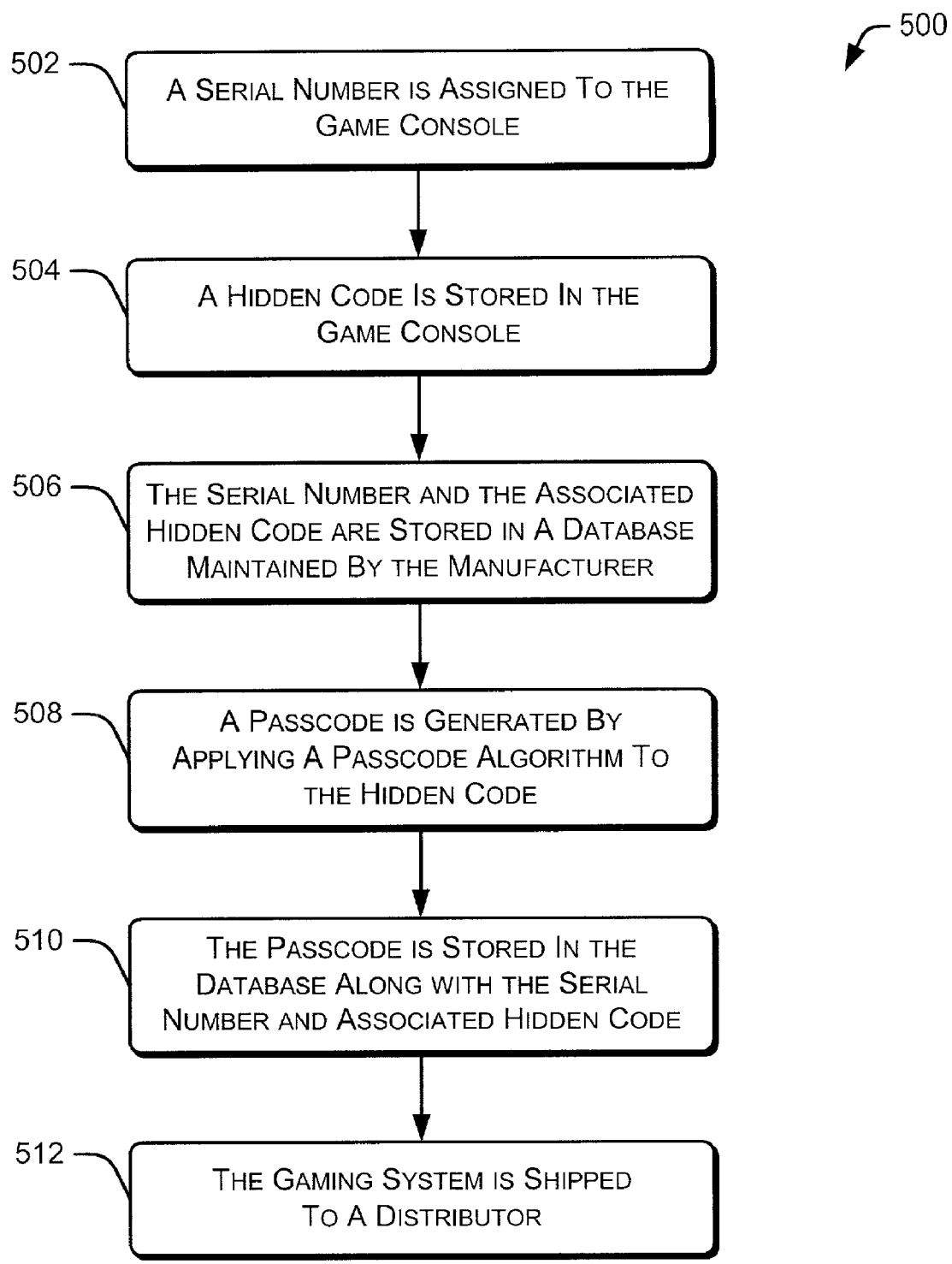
FIG. 5 is a flow diagram of a process that assigns a hidden code to a gaming system having a serial number.

FIG. 5 is a flow diagram of a process 500 that assigns a hidden code to a gaming system having a serial number. During the manufacturing of the gaming system, a serial number is assigned to the game console (block 502). Typically, the serial number assigned to each game console is unique. A hidden code is stored in the game console (block 504). This hidden code is not generally accessible to the user of the game console and is stored in a non-volatile memory, such as the console partition of the hard disk drive or other non-volatile memory device. As discussed below, the hidden code is used to generate a passcode that resets the game console hard disk drive to a factory default state. The hidden code is not necessarily unique. The hidden code is not generally accessible to the user of the game console, thus preventing the user from resetting the game console without first contacting a technical support agent. By hiding this code, a malicious user is prevented from resetting another user's game console, which would result in the deletion of numerous saved games, high scores, etc.

The game console serial number and the associated hidden code are stored in a database (or other data storage mechanism) maintained by the manufacturer (block 506) or another entity. For example, the game console serial number and associated hidden code may be stored in database 312 (FIG. 3). This database can be accessed, for example, by a technical support agent to identify the hidden code associated with a particular game console. A passcode is generated by applying a passcode algorithm to the hidden code (block 508). The passcode represents a series of button presses or other control inputs to a controller coupled to the game console. The passcode may contain any number of button presses or other control inputs, although a typical passcode contains a sequence of 3–8 button presses or other control inputs. In alternative embodiments, the passcode may represent a series of button presses or other control inputs to the game console itself. The following are exemplary passcodes:

Button B-Left Trigger-Up D-pad-Button Y

Left Thumbstick-Button A-Up Thumbstick-Down Thumbstick

Up D-pad-Right Thumbstick-Left Trigger-Button X-Right Trigger

Various types of algorithms may be used to convert a hidden code into a passcode. For example, each character in the hidden code may be converted into a particular control input.

The passcode is stored in the database along with the serial number and the associated hidden code (block 510). The database may also contain information regarding the algorithm used to generate the passcode, particularly if more than one algorithm is used to generate passcodes. The gaming system is then shipped to a distributor or otherwise made available for distribution to an end user (block 512).

Figure 6:
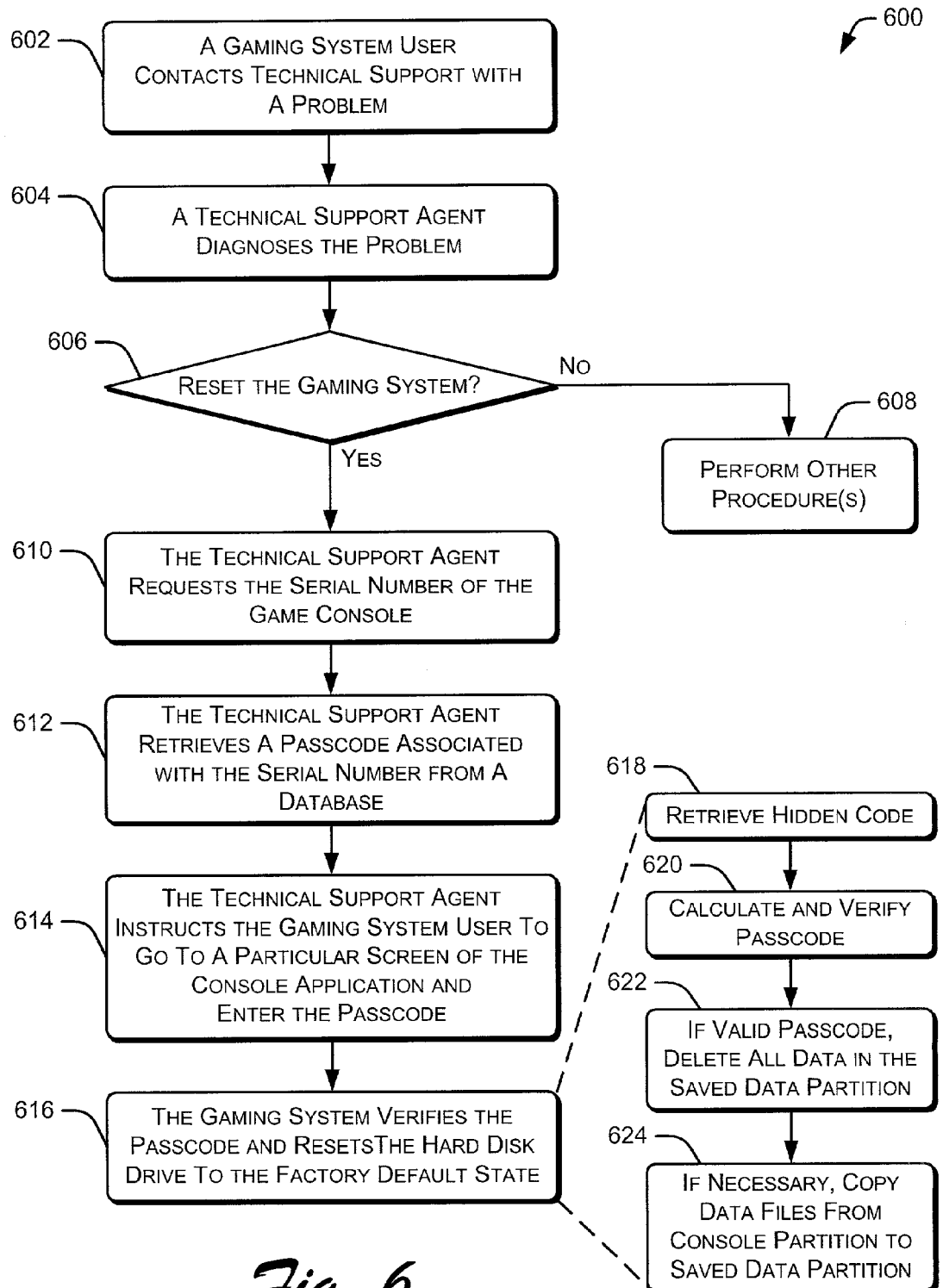
FIG. 6 is a flow diagram of a process that resets a hard disk drive to a factory default state.

FIG. 6 is a flow diagram of a process 600 that resets a hard disk drive to a factory default state. Initially, a gaming system user contacts a technical support department after experiencing a problem with the gaming system (block 602). Problems may include an inability to turn on the device, inconsistent operation, improper operation, "freezing" while an application is executing, etc. A technical support agent obtains information from the user of the gaming system regarding the problem and diagnoses the problem (block 604). If the solution to the diagnosed problem does not include resetting the gaming system, the user of the gaming system is asked to perform various procedures or operations (block 608).

If the solution to the diagnosed problem includes resetting the gaming system, the technical support agent requests the serial number of the user's game console (block 610). Alternatively, the serial number of the user's game console may be obtained by the technical support agent prior to diagnosing the problem. The technical support agent then retrieves a passcode associated with the serial number from a database (block 612), such as the database discussed above with respect to FIG. 5. The technical support agent then instructs the gaming system user to go to a particular screen of the console application and enter the passcode provided to the user by the technical support agent (block 614). The particular screen that accepts the passcode may be a typical system configuration screen (or any other screen) that does not necessarily indicate that a passcode can be entered. At block 616, the gaming system verifies that the proper passcode has been entered and, if the passcode is correct, resets the hard disk drive in the game console to the factory default state.

As shown in FIG. 6, block 616 represents four separate blocks, labeled 618–624. Specifically, the process 600 retrieves the hidden code stored in a non-volatile memory of the game console (block 618). The process then calculates a passcode using the hidden code and the same algorithm discussed above with respect to FIG. 5 and verifies the passcode against the series of button presses or other control inputs entered by the user of the gaming system (block 620). If the user entered the proper passcode, all data in the saved data partition of the hard disk drive is deleted (block 622). However, data in the console partition of the hard disk drive is not deleted. The deleting of data in the saved data partition may be performed by executing the reset application 420 stored in the console partition of the hard disk drive. If necessary, data files and/or system utilities are copied from the console partition to the saved data partition after the old data is deleted from the saved data partition of the hard disk drive (block 624). At this point, the game console can be rebooted and will function in a manner similar to a factory fresh game console.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A method comprising:
   assigning a serial number to a game console;
   storing a hidden code in a storage device contained in the game console;
   storing the serial number and the associated hidden code in a database for later reference, wherein the database is maintained by a manufacturer of the game console; and
   generating a passcode by applying a passcode algorithm to the hidden code, wherein the passcode identifies a series of control inputs required to reset the game console.

2. A method as recited in claim 1 further comprising storing the passcode in the database with the associated serial number.

3. A method as recited in claim 1 wherein the series of control inputs are applied to the game console using a controller coupled to the game console.

4. A method as recited in claim 1 wherein the same passcode is generated by the game console by applying the same passcode algorithm to the hidden code stored in the game console.

5. One or more computer-readable media comprising computer-executable instructions that, when executed, perform the method as recited in claim 1.

* * * * *

UNITED STATES PATENT AND TRADEMARK OFFICE
CERTIFICATE OF CORRECTION

PATENT NO. : 6,996,744 B2
APPLICATION NO. : 10/116900
DATED : February 7, 2006
INVENTOR(S) : Jon Marcus Randall Whitten et al.

It is certified that error appears in the above-identified patent and that said Letters Patent is hereby corrected as shown below:

On the Title page, in field (56), under "U.S. Patent Documents", in column 1, line 5, delete "Biegun et al." and insert -- Eliott --, therefor.

On the Title page, in field (56), under "Other Publications", in column 2, line 3, delete "fulllicensed" and insert -- fully-licensed --, therefor.

On the Title page, in field (56), under "Other Publications", in column 2, line 17, after "and" insert -- the --.

Title page 2, in field (56), under "Other Publications", in column 1, line 5, delete "games" and insert -- game --, therefor.

Signed and Sealed this

Twenty-ninth Day of September, 2009

David J. Kappos
*Director of the United States Patent and Trademark Office*